United States Patent [19]

Rand

[11] Patent Number: 4,877,205

[45] Date of Patent: Oct. 31, 1989

[54] HIGH-ALTITUDE BALLOON AND METHOD AND APPARATUS FOR MAKING IT

[75] Inventor: James L. Rand, San Antonio, Tex.

[73] Assignee: Winzen International, Inc., San Antonio, Tex.

[21] Appl. No.: 138,586

[22] Filed: Dec. 28, 1987

[51] Int. Cl.⁴ .............................................. B64B 1/58
[52] U.S. Cl. ..................... 244/31; 156/160; 156/229; 156/251
[58] Field of Search .................. 244/31, 125; 156/160, 156/229, 251, 290

[56] References Cited

U.S. PATENT DOCUMENTS

| | | | |
|---|---|---|---|
| 2,526,719 | 10/1950 | Winzen | 244/31 |
| 2,635,671 | 4/1953 | La Mere et al. | 154/42 |
| 2,656,293 | 10/1953 | Huch | 156/251 |
| 2,666,006 | 1/1954 | La Mere et al. | 154/85 |
| 2,666,600 | 1/1954 | Huch et al. | 244/31 |
| 2,703,769 | 3/1955 | Stinger et al. | 154/85 |
| 2,767,940 | 10/1956 | Melton | 244/31 |
| 2,767,941 | 10/1956 | Gegner et al. | 244/31 |
| 2,771,256 | 11/1956 | Ryan | 244/31 |
| 2,858,090 | 10/1958 | Winzen et al. | 244/31 |
| 2,961,194 | 11/1960 | Thorness | 244/31 |
| 2,999,042 | 9/1961 | Meister | 154/116 |
| 3,041,013 | 6/1962 | Froehlich | 244/31 |
| 3,041,019 | 6/1962 | Froehlich | 244/99 |
| 3,047,252 | 7/1962 | Huch et al. | 244/31 |
| 3,063,656 | 11/1962 | Bohl et al. | 244/31 |
| 3,109,611 | 11/1963 | Yost | 244/31 |
| 3,109,612 | 11/1963 | Winker et al. | 244/31 |
| 3,182,932 | 5/1965 | Winker | 244/31 |
| 3,270,987 | 9/1966 | Winckler et al. | 244/31 |
| 3,311,328 | 3/1967 | Slater | 244/31 |
| 3,534,927 | 10/1970 | Harding | 244/31 |
| 3,773,279 | 11/1973 | Wright | 244/31 |
| 4,267,989 | 5/1981 | Skaggs | 244/31 |
| 4,434,958 | 3/1984 | Rougeron et al. | 244/126 |

Primary Examiner—Joseph F. Peters, Jr.
Assistant Examiner—Rodney Corl
Attorney, Agent, or Firm—Ann C. Livingston

[57] ABSTRACT

A high-altitude balloon having prestrained gores made from an asymmetrical gore pattern. The invention includes the balloon, the method of assembling the balloon, and a table specially designed to implement the method. The method can be used to assemble balloons of varying shapes and sizes, within a determinable range of ratios of gore width to gore length. The method involves cutting and sealing edges of a pair of flexible plastic sheets along a straight edge of a table, then inverting the seam so formed until it is aligned with a curved index line on the surface of the table. The curved index line is longer than the seam created along the straight edge so stretching is required during inverting. Successsively cutting, joining and inverting pairs of sheets in this manner produces a balloon with a plurality of symmetrical gores that give the balloon a predetermined shape when inflated.

21 Claims, 3 Drawing Sheets

HIGH-ALTITUDE BALLOON AND METHOD AND APPARATUS FOR MAKING IT

BACKGROUND OF THE INVENTION

1. Field of The Invention

This application relates to high-altitude balloons, and to a method and an apparatus for making them. In particular, the invention relates to balloons whose gores are made from an asymmetrical pattern and are prestrained, and the method and a specially-designed table used to make and assemble these gores.

2. Description of The Prior Art

Most high-altitude balloons are inflatable structures made up of a number of gores. These gores are constructed of material that must be light, strong, nonporous, flexible, and capable of keeping these properties at low temperatures.

When inflated, a typical balloon varies from 300 to 600 feet in length, being rounded at the top, and tapering to a point at the bottom. To give the balloon its desired shape when inflated, assembly of the balloon requires selecting a particular shape of the gores. This shape causes the top of the balloon to be flatter than the bottom and the upper half of the balloon more spherical than the bottom half, which results in enhanced resistance of the balloon to higher pressures and weight.

The basic parts of a typical balloon include a gore envelope, which is assembled from gores attached together at their edges to form seams, a means for securing the gores at the top of the balloon, a means for securing the gores at the bottom of the balloon, and a fitting for attaching a payload.

For balloons made in the traditional manner, when uninflated, each gore is identical in shape and size. When laid flat on a two-dimensional plane, the shape of each gore is the union of two curves, which meet at two points, these points being the top and bottom of the gore. The gore length is a straight line drawn from the top point to the bottom point. Each gore is symmetric around the gore length, with the gore edges being longer than the gore length. The gore width varies from the top to the bottom of the gore.

The gore envelope is assembled on a two-dimensional plane. This requires laying elongated sections of the gore material on the surface of an elongated table. The table has a flat, smooth upper surface whose area is larger than the area of each gore.

In the traditional method of making balloons, one long edge of the table is curved to a shape corresponding to the desired curvature of the gore. The curved table edge is a guide for cutting and sealing gore edges. Opposite the curved table edge, a curved index line is marked on the surface of the table. This index line creates a symmetric pattern for the opposing edge of each gore. Thus, the shape of a single gore is defined on the table, on one side by the curved table edge, and on the other side by the index line.

The gore assembly table is used with a cutting and sealing machine that is moved in a curved path along the table's curved edge. The cutting and sealing machine trims the gore material to the desired gore shape and heat seals adjacent gore edges together. At each pass of the cutting and sealing machine along the table, two gore edges, one each from what will become adjacent gores, are sealed together to form a seam. If desired, load tape or reinforcing tape may be added to the seam.

The gores of the balloon are cut and sealed sequentially. To form the first seal, two sheets of gore material are laid one atop the other along the table. The bottom, or first, sheet will become the last gore and the top sheet, or second, will become gore one. The first edge of the first sheet will be used to make the last seal. A second edge of the first sheet and a first edge of the second sheet, which lie along the curved edge of the table, are cut and sealed together with the cutting and sealing machine. After seal one is made, it is inverted and placed along the index line. This ensures that the next gore edge to be cut and sealed will be symmetrical with the prior edges. At the same time, the unsealed second edge of the second sheet is pulled toward the curved edge of the table so that it overlaps the curved edge. A third sheet of gore material is laid atop the second sheet. The second edge of the second sheet and the first edge of the third sheet and are then cut and sealed together. This forms seam two. Gore one between seam one and seam two is now complete.

The rest of the gores are assembled in the same manner, except that the last seam is made differently. This last seam is made by pulling the unsealed first edge of the first sheet of gore material over the last sheet, rather than by laying down a new piece of gore material. The unsealed edge of the first sheet is then sealed to the unsealed edge of the last sheet.

This traditional method of assembling gores and a table apparatus for doing so are described in U.S. Pat. No. 2,666,006 (LaMere eta 1. 1954) and U.S. Pat. No. 2,635,671, (LaMere et al. 1953). The method disclosed in U.S. Pat. No. 2,666,006 teaches the steps of arranging two gores face to face and cutting and sealing them as described above. A reinforcing tape is added to the completed seam. After the seam is complete, the LaMere method applies longitudinal tension to the tape and seam. The purpose of this longitudinal tension is to maintain the tape and the seam under uniform and constant tension throughout assembly. The table disclosed in U.S. Pat. No. 2,635,671 has a fixed curved edge, whose curvature must correspond to the shape of the curved edges of the gores of the balloon. The curved edge of the table and the symmetrically-curved index line define a single size gore, and therefore a single size balloon. For example, a balloon with a 300-foot gore length requires a different gore length and curvature to the gore edges and therefore a different shape table than a 600 foot balloon. Thus, the table with the curved cutting edge must be built specifically to build a specific size balloon, and cannot be used for any other sized balloon. If a number of different sized balloons are desired, a table for each must be built. Another problem is that because the cutting and sealing machine runs along a curved edge, the machine is continually changing direction, increasing the likelihood of defective or flawed seals.

SUMMARY OF THE INVENTION

One object of the invention is to provide a balloon whose gore pattern need not be symmetrically shaped.

Another object of the invention is to provide a balloon whose gores have edge lengths approximately equal to the gore length when the balloon is in an assembled but uninflated condition.

Another object of the invention is to provide a balloon whose gores are prestrained to the desired balloon curvature.

Another object of the invention is to provide a method to make a balloon whose gore pattern need not be symmetrically shaped.

Another object of the invention is to provide a method by which balloons of different shapes and sizes may be constructed on a single table.

Another object of the invention is to provide a method by which balloons of different shapes and sizes may be constructed on a single table.

Another object of the invention is to provide a table for cutting and sealing balloon gores, each having one edge that is straight rather than curved.

Another object of the invention is to provide for a method of cutting and sealing gores in which the cutting and sealing is performed along a straight line rather than a curved path. For example, a cutting and sealing machine may ride along a straight track anchored either to the floor or the table. This method improves the quality of the seals by eliminating defects attributable to cutting and sealing along a curved edge of a table. It also permits seams to be made more quickly, thereby decreasing the overall assembly time for a balloon.

It is a further object of the present invention to provide for a flat, smooth, permanent table with a straight edge for use as a cutting and sealing guide. A cutting and sealing machine may be permanently anchored to this straight edge to eliminate the unevenness and other influences of the floor.

DESCRIPTION OF THE PREFERRED EMBODIMENT

Figure 1:
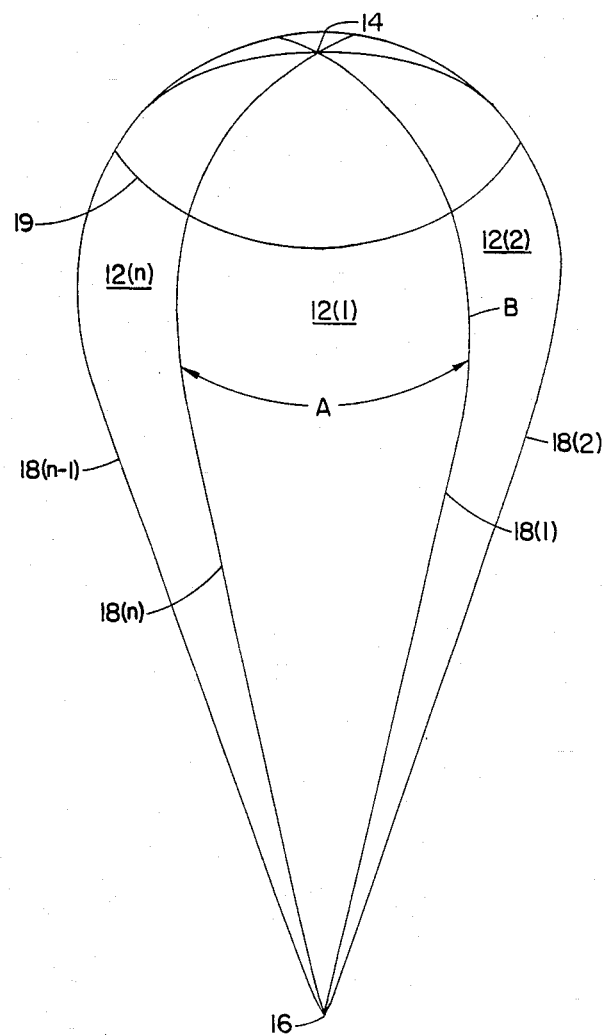
FIG. 1 is a front elevational view of an assembled and inflated balloon.

FIG. 1 illustrates an inflated balloon made by the process disclosed herein. The balloon has a number of gores 12 attached together side by side, a typical balloon having many gores. The balloon has a top vertex 14 and a bottom vertex 16. Each gore tapers toward vertices 14 and 16.

Three representative gores, labelled as 12(1), 12(2), and 12(n), are shown. Gores 12 are defined by seams 18. Four representative seams, labelled as 18(1), 18(2), 18(n-1), and 18(n), are shown. Load tapes 13 are sealed to the balloon at seams 18. Both the shape of the balloon and load tapes 13 distribute and carry the weight of any load that may be suspended under the balloon. Load tapes 13 reduce stretching of the gore material by the weight of the load.

Each gore consists of at least one full-length gore and may include one or more partial gores. The full-length gores comprise the balloon envelope. The partial gores overlay or underlay the full-length gores, sharing the same seams with the full-length gores. In FIG. 1, the balloon has one layer of partial gores, which comprises cap 19.

Distance A is the width of each gore 12 at any given point. Distance B is the length of each seam 18 of adjacent gores 12, measured from vertex to vertex.

At the top and at the bottom vertex, the ends of the gores are united by sealing or clamping them together. They may also be fitted with valves or other apparatus for inflating or deflating the balloon. In the preferred embodiment, special fittings are provided at the top and bottom vertex. The top fitting generally consists of a number of clamps arranged around a ring, with holes for inserting valves. The bottom fitting generally consists of an outer collar that is tightened around the gore ends against an inner piece consisting of two wedges drawn together by a bolt. The bottom fitting also serves as a place of attachment for any load that the balloon may carry aloft. Many other means for uniting the top and bottom ends of the gores are known in the art.

The material from which gores 12 is made is a flexible blown plastic film. An example of such a material is STRATOFILM (a registered trademark of Winzen International, Inc.), which is specifically developed for large high-altitude balloons and made of a low-density polyethylene polymer. Material used for making gores is purchased in seamless rolls. The rolled material must be wider than the desired gore; these rolls are usually 108 inches wide. Although this material is used in the preferred embodiment, other plastic or synthetic materials having similar qualities of flexibility, elasticity, sealability, non-permeability could be used.

Figure 2:
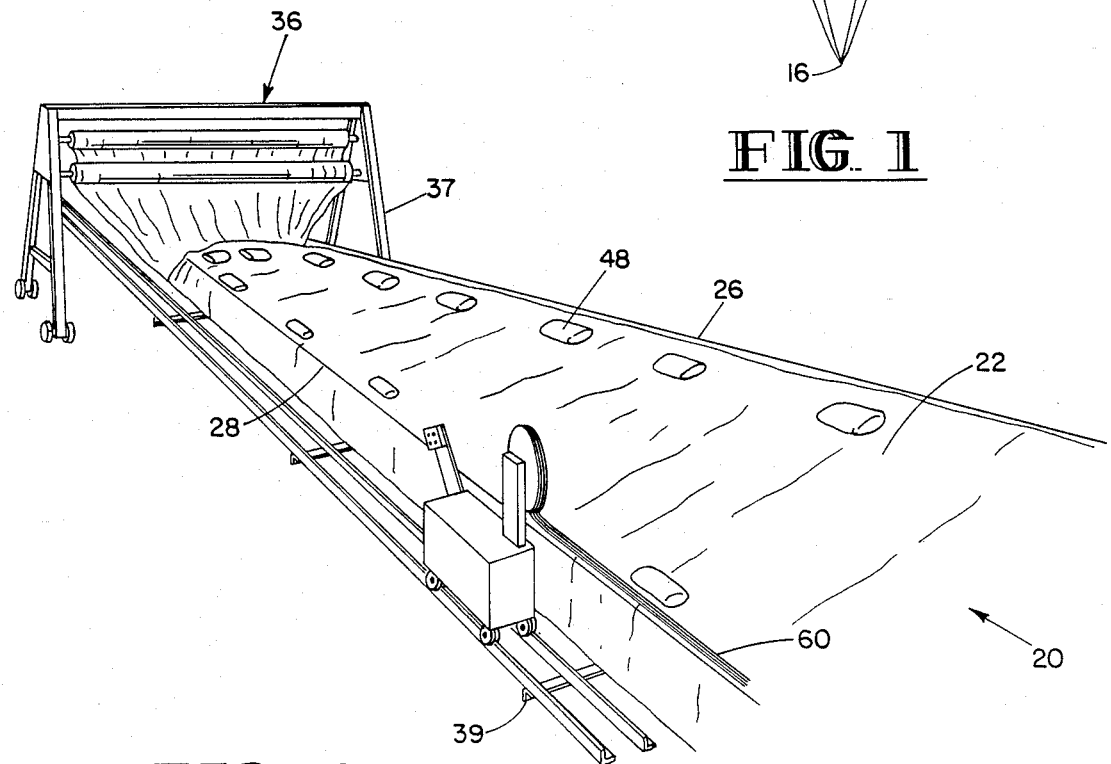
FIG. 2 is a perspective view of a table used for cutting and assembling balloon gores, also showing a gore material dispenser and a cutting and sealing machine.
Figure 3:
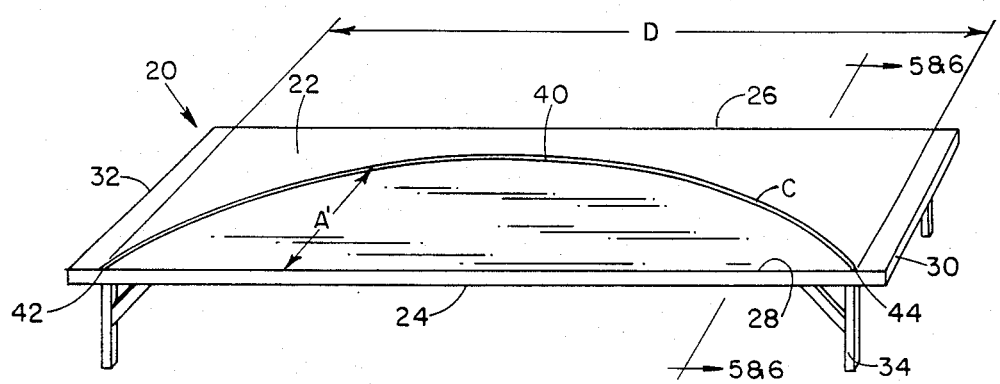
FIG. 3 is a front perspective view of the table shown in FIG. 2.

FIGS. 2 and 3 illustrate a table 20 on which the gore envelope is assembled. The surface 22 of table 20 is flat and smooth and its area is preferably an elongated rectangle. Table 20 has two long sides 24 and 26. At least one long side 24 or 26 is straight, indicated in FIGS. 2 and 3 as side 24. Edge 28 is straight and defines the intersection of straight side 24 with surface 22, such relation being perpendicular. Ends 30 and 32 are preferably perpendicular to straight side 24 and parallel to each other. Legs 34 of table 20 should be sufficiently strong to support table 20 and sufficiently stable to prevent its movement. In the preferred embodiment, table 20 is 106 inches wide and at least as long as the desired gore length.

As shown in FIG. 2, overhead dispenser 36 is mounted on a frame 37 straddling table 20. Frame 37 is mounted on wheels so that it may be easily moved along and over table 20. Overhead dispenser 36 holds one or more rolls of gore material, which are rotatable so that gore material may be laid on table 20 as overhead dispenser 36 moves along and over table 20. In this embodiment, side 26 of table 20, as well as side 24, is straight so that dispenser 36 may bear against it as it moves. In an alternative embodiment, dispenser 36 may be mounted by an overhead rail, in which case, it is unimportant whether edge 26, the non cutting and sealing side, is straight.

Cutting and sealing machine 38 is mounted on a track 39 anchored to table 20. Power is delivered to the cutting and sealing machine 38 from track 39, and the speed of heating and sealing machine 38 is automatically controlled. This type of machine is known in the art, and generally consists of a heated member that cooperates with an anvil member. The machine fuses the material together and trims away excess material at and along straight edge 28.

As shown in FIG. 3, index line 40 is located on surface 22. The shape of index line 40 is predetermined to encourage the desired shape of the balloon when inflated. Index line 40 is a mathematically-calculated curve, whose calculation is explained in further detail below. The length C of index line 40 is greater than the length of seam B and varies according to the desired curvature and length of seam B. Index line 40 is made from a removable and flexible material such as tape so that it can be curved to the proper shape and so that it may be easily relocated on surface 22.

Points 42 and 44 define the junction of index line 40 and edge 28 and correspond to the top and bottom vertex of each gore. Line 42-44 is the straight line connecting points 42 and 44. Distance D is the length of line 42-44, and is less than distance C. Distance A' is measured perpendicular to line 42-44, from line 42-44 to index line 40, at points along line 42-44.

Figure 4:
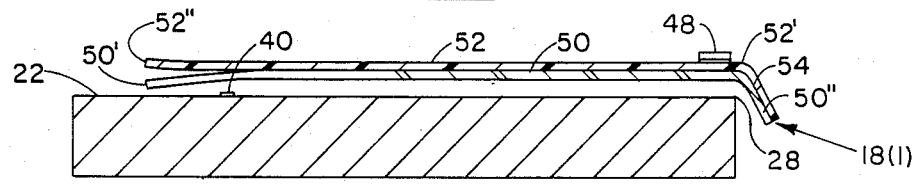
FIG. 4 is a side view of the table shown in FIGS. 2 and 3, also showing a schematic side view of two gores after the first seal of a balloon has been made.

FIG. 4 illustrates the first seal made during assembly of the balloon. For simplicity, the assembly of a single-layer balloon envelope with no partial gores is shown. Overhead dispenser 36 has been moved over table 20, dispensing gore material as it moves. The gore material is laid on surface 22 of table 20 and cut to the appropriate length to form first sheet 50. Then, dispenser 36 is moved again over table 20, dispensing second sheet 52 atop first sheet 50. Alternatively, more than one sheet can be dispensed during a single pass. Sheets 50 and 52 are smoothed across table 20 so that both overlap index line 40 and edge 28. To facilitate cutting and sealing, a preliminary cutting may remove excess material extending beyond index line 40 and edge 28. Weights 48 are placed at points 42 and 44 and at intervals along edge 28, to hold sheets 50 and 52 in place to keep wrinkles from developing in the gore material during cutting and sealing.

Next, cutting and sealing machine 38 is moved along edge 28. Cutting and sealing machine 38 cuts and seals second edge 50" of sheet 50 to first edge 52' of sheet 52. This forms first seam 18(1).

Figure 5:
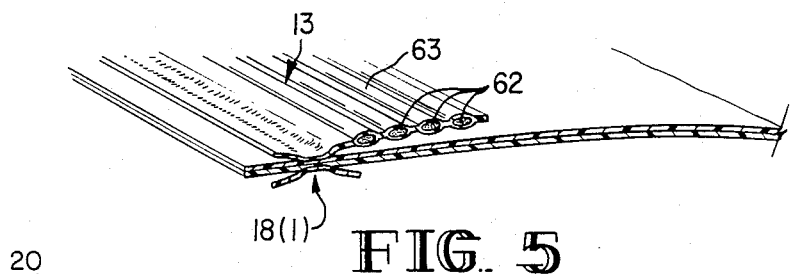
FIG. 5 is a front view of part of a completed seam.

FIG. 5 shows completed seam 18(1), which is the same as all other seams 18. During the cutting and sealing process, load tape 13 is incorporated into seam 18(1) and simultaneously sealed to seam 18(1) at the two gore edges 50" and 52'. A strip of buffer plastic may also be simultaneously sealed into seam 18(1), for the purpose of adding material to the seam. Load tape 13 is manufactured by enclosing one or more bundles of fibers 62, such as polyester, between layers of film and holding them in place by laminating the layers. Regardless of the method of manufacturing load tapes, there is slack in the fibers 62. As a result of this slack, when the load tapes are stretched, resistance is small until the fibers 62 are straightened. As shown in FIG. 5, load tape 13 is sealed to seam 18 so that it forms a fin 63, which extends from seam 18. Load tape 13 is attached to seam 18 so that it will be on the outside of the balloon when assembled.

Figure 6:
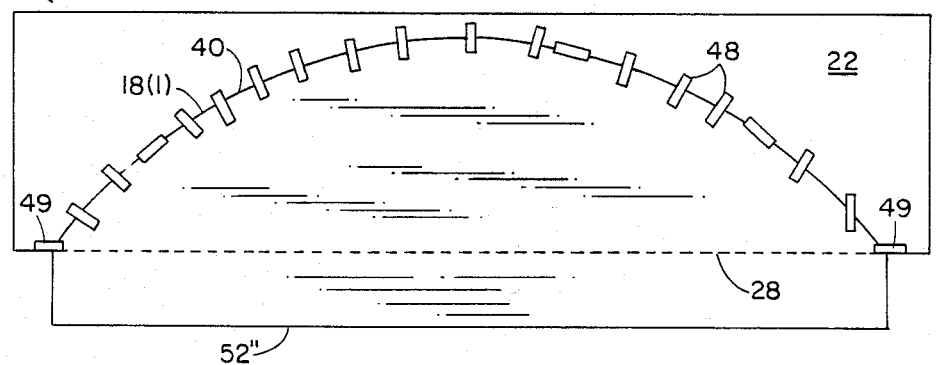
FIG. 6 is a plan view of the table shown in FIGS. 2 and 3, during the cutting and sealing process.

The next step involves inverting first seam 18(1). This is done by first removing weights 48 from along edge 28, then lifting second sheet 52 slightly and pulling first seam 18(1) back through and between sheets 50 and 52 toward index line 40. FIG. 6 shows first seam 18(1) after being inverted and aligned along index line 40. At points 42 and 44 there is not much translation of seam 18(1) because the distance from line 42-44 and index line 40 is small. Therefore, weights 48 are immediately replaced at points 42 and 44, fixing seam 18(1) at points 42 and 44. To further immobilize seam 18(1) at points 42 and 44 during inverting, it is taped to table 20 with tape 49 at those points.

To fully understand the inverting process, it is important to understand the forces and strains involved. Seam 18(1) is inverted by the application of force directed outward from sheets 50 and 52 in a direction perpendicular to edge 28. This force is applied until seam 18(1) is aligned with index line 40. To understand the alignment of seam 18(1) with index line 40, it is necessary to recognize that distance C along index line 40 is greater than distance D along straight edge 28. Thus, as seam 18(1) is inverted it must be stretched from its preinverted length D to its inverted length C. A typical gore, for example, has a preinverted seam length of 600 feet along straight edge 28. During inversion, however, this seam stretches as it is aligned along curved index line 40, which is, for example, 601 feet long. This creates a strain in the gore material. Inverting of seam 18(1) requires tension with both latitudinal and longitudinal components to be applied. Load tape 13 is designed to accommodate this stretching. As load tape 13 is stretched, it stretches the gore material to which is is sealed. As explained in further detail below, the amount of tension created in the gore material is a predetermined relationship to the amount of slack in the load tape fibers 62. The tension created by stretching seam 18(1) during the inverting process creates force at points 42 and 44. Thus, the number and weight of weights 48, combined with tape 49 at points 42 and 44, must be sufficient to overcome both the laterally and longitudinally directed reactive forces created by stretching seam 18(1).

As shown in FIG. 6, after seam 18(1) has been inverted, first edge 50' (not shown) of sheet 50 has been placed under sheets 50 and 52, to be available for making the last or closing seal. Second edge 52" of the second sheet 52 is pulled toward edge 28 and now overlaps edge 28. Weights 48 are placed at intervals along index line 40, to hold seam 18(1) smooth and in place during subsequent cutting and sealing. Tape 49 further fixes seam 18(1) at points 42 and 44.

Figure 7:
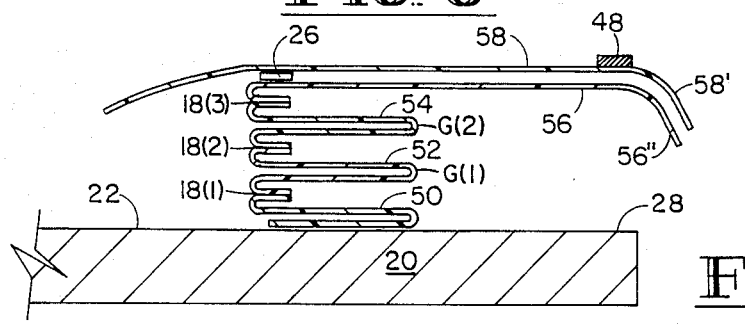
FIG. 7 is a side view of the table shown in FIGS. 2 and 3, also showing a schematic side view of three inverted seams and two edges of a fourth and fifth sheet of gore material prior to making seam four.

FIG. 7 shows seams 18(1), seam 18(2), and seam 18(3), and the corresponding gores 12(1) and 12(2). To make second seam 18(2), a third sheet 54 of gore material is dispensed from the gore material dispenser and laid atop the table over sheets 50 and 52, so it overlays edge 28 and index line 40. Weights 48 are then placed atop the second edge 52" of the sheet two 52 and the first edge 54' of sheet three, along edge 28. Cutting and sealing of these edges are performed as described above, with the second edge 52" of sheet 52 being sealed to the first edge 54' of sheet 54. This forms seam 18(2).

Inverting of seam 18(2) completes gore one 12(1). The inverting of seam 18(2) and all subsequent seams is similar to the inverting of seam 18(1). Weights 48 along edge 28 are removed, so that seam 18(2) may be moved.

Weights 48 are replaced at points 42 and 44 as seam 18(2) is inverted, and seam 18(2) is taped at those points, thereby keeping the gore material fixed at points 42 and 44. As seam 18(2) is inverted, each weight 48 is lifted from index line 40, seam 18(2) is placed atop seams 18(1), and weight 48 is replaced. A second edge 54″ of the third sheet 54 is pulled toward edge 28 and placed under weights 48 along edge 28 and at points 42 and 44.

As shown in FIG. 7, three seams have each been completed and inverted, and are stacked one on top of the next. When each inverted seam reaches the index line 40, weights 48 are temporarily lifted while the newly inverted seam is placed atop index line 40. A second end 56″ of sheet 56 is draped over edge 28 in preparation for making the next seam. Sheet 58 has been laid over sheet 56 from the dispenser 36 in the same manner as explained above. The next step will be a pass of cutting and sealing machine 38.

Figure 8:
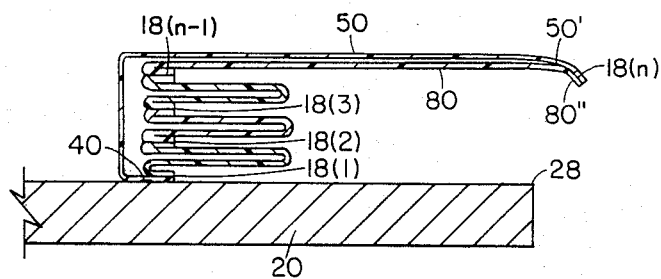
FIG. 8 is a side view of the table shown in FIGS. 2 and 3, also showing a schematic side view of four representative gores of an assembled balloon and the last seam of the balloon.

FIG. 8 illustrates the method of sealing closing seam 18(n), to form final gore 12(n). Closing seam 18(n) is the last seam required to produce a complete balloon envelope. Only four representative gores are shown, but a typical balloon will have many such gores. Rather than laying a new sheet of gore material, the unsealed first edge 50′ of first sheet 50 is pulled over the stack of inverted seams and draped over edge 28. First sheet 50 now overlays last sheet 80, and its first edge 50′ is cut and sealed to the second edge 80″ of sheet 80 in the same manner as the prior seams were cut and sealed.

After closing seam 18(n) is made, all the gores have been attached, one to the other. This completes all of the sealing steps and the inflatable balloon envelope structure is substantially complete. After closing seam 18(n) has been made, weights 48 may be removed and the balloon envelope lifted from table 20. The prestrained seams 18 relax to their preinverted length, distance D.

When the balloon is in an assembled but uninflated condition, the length of each seam 18 is approximately the length of distance D. Although the gore pattern created by edge 28 and index line 40 is asymmetrical, the gore edges are symmetrical because each gore is inverted and stretched in the same manner. A significant difference between a balloon made by the prior art and the balloon made by the method disclosed herein is in the gore lengths. Prior balloons required the seam length to be greater than the gore length. This difference in length resulted in the desired balloon shape, with a larger difference resulting in a larger curvature. In the present invention, however, the balloon has gores whose unstretched seam length is approximately the same as the gore length. Because each gore is prestrained, the balloon will have a predetermined shape when inflated. By calculating the amount of prestrain that will occur for a given balloon shape, and by using an appropriate index line and load tape, the desired shape can be obtained.

In the invention disclosed herein, when seams 18 are stretched during inverting, there is some removal of slack in the load tape fibers 62. This removal of slack must be accommodated when determining the degree of elasticity desired in the load tape 13. $E_o$ is the point at which the slack in the load tape fibers 62 is substantially removed, and at which begins great resistance to further stretching, or the "limiting strain value". The value of $E_o$ is controlled by varying the fiber slack during load tape manufacturing; typically $E_o$ values are between 1% and 5%. For example, an $E_o$ value of 1% means that the load tape can be stretched 1% of its unstretched length before the resistance to stretching becomes significant.

Figure 9:
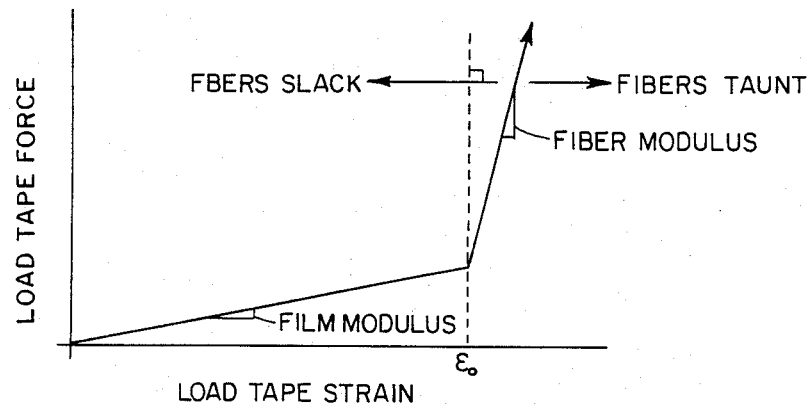
FIG. 9 illustrates the relationship between the strain in the gore seams, caused by inverting them during assembly, to the resistance of the load tape.

FIG. 9 illustrates the effects of the strain caused by stretching of a seam 18 from edge 28 to index line 40. This strain, or E, is calculated as the change in length of the seam 18 divided by the length, or in differential terms:

$$E = (ds - ds_o)/ds_o.$$

For example, if a 600-foot seam is stretched to 630 feet, E is 5%. If $E_o$ of the lod tape is also 5%, further stretching will require great force, as indicated by the change of slope of the plotted line. The method of construction disclosed herein may be used so long as E is less than $E_o$.

Figure 10:
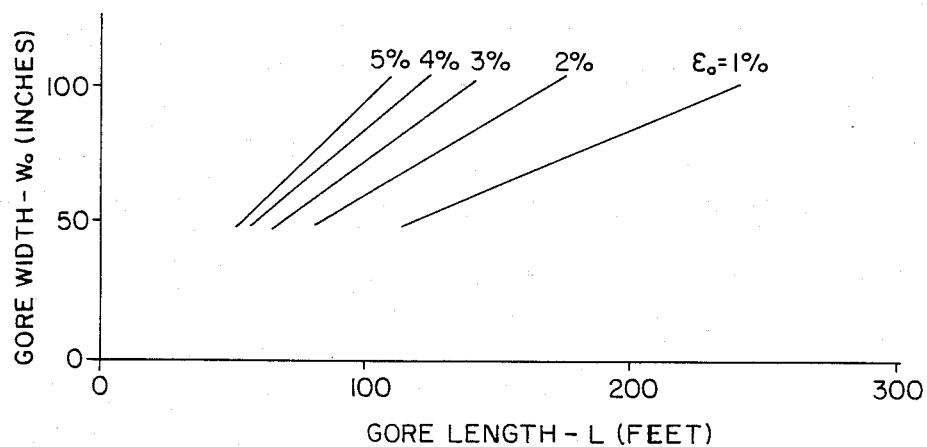
FIG. 10 illustrates the possible relationships between the gore length and the gore width.

FIG. 10 shows the possible relationships between gore lengths and widths of balloons that can be assembled using this method and apparatus. The gore width, y, at any point along the distance D on table 20 is approximated by the following parabolic equation:

$$y/W_o = 1 - 4(x/L)^2,$$

where $W_o$ is the maximum width of the gore pattern, x is the distance from the midpoint of line 42–44 to the point where y is measured, and L is the total length of line 42–44. During inverting of seam 18, as a point on the seam 18 is pulled perpendicular to edge 28 to index line 40, a strain will develop along seam 18, approximated as:

$$E = 8 (x/(L/2))^2 (W_o/L)^2$$

This strain is 0 at the center of the gore (x=0) and maximum at points 42 and 44 (x=L/2). The objective is to make E less than $E_o$, or E $<E_o$. Substituting for E, and solving for L, the distance L required to ensure that E is less than $E_o$ is calculated as follows:

$$L >= 8/E_o)^{\frac{1}{2}} W_o$$

As shown in FIG. 10, for each desired gore length there is a particular gore width at which there is a limiting strain value. This critical point further varies according to the value of $E_o$ of the load tape. Within the ranges illustrated by FIG. 10, the size and shape of balloons made by the method disclosed herein are infinitely variable by changing index line 40.

An advantage of the present invention is inherent in the prestraining of load tapes 60 along seams 18. In the traditional manner of assembling balloons, when the balloon was assembled and uninflated, the length of the seams was greater than the gore length. Upon inflation, as a result of pressures inside the balloon, the balloon tends to become evenly rounded. This causes the material along the center line of each gore to stretch to approach the length of the seams. It follows that this center line is subject to greater strain than the edges of the gore. Thus, the center line of the gore is a likely place for failure of the balloon material. In the present invention, when the balloon is assembled but not yet inflated, seams 18 are the same as the gore length, but the load tapes 60 in seams 18 are prestrained. Upon inflation, as compared to the traditional manner of assembling balloons, the available slack in the load tapes 60 is less. As the balloon inflates, the stress is placed upon the lod tapes 60 rather than along the center line of the gore.

Index line 40 may be calculated and changed to make varying sizes of balloon. A desired gore shape and size for an inflated balloon is used as a reference. Distances perpendicular to the gore length are measured to the reference gore edge at points along regular intervals beginning at one end of the gore and continuing to other end of the gore. The same distances are measured from corresponding points along line 42-44. A point is marked at the end of each distance. A tape is placed on table 20 connecting these points. This tape defines the gore edge of the asymmetrical gore pattern from which gores are assembled using the invention disclosed herein. Changing the shape of the index line 40 requires approximately two hours, whereas the prior art required making a new table with the necessary shape of curved cutting edge.

If desired, cap 19 can be added to the balloon. The purpose of cap 19 is to increase the balloon's ability to withstand launch and ascent forces. The additional steps required are the placing of an additional roller on dispenser 36 from which an extra sheet of gore material is laid for each full-length gore. This extra sheet of gore material is cut to a predetermined length, which is typically less than one-half of the full gore length. The edges of the cap material coincide with the edges of the full-length gore and are cut and sealed at the same time as these corresponding full-length gore edges. One or more caps can be constructed in this manner.

In the preferred embodiment as described above, the edge 28 of table 20, which is used for cutting and sealing, is straight. The invention, however, is easily adapted to a table with a curved cutting and sealing edge. The advantage of the method herein is that index line 40 need not be symmetrical with the cutting and sealing edge of the table, and may be altered to make balloons of varying sizes and shapes. Thus, a table previously usable only for a single size and shape balloon can be used for different sizes and shapes of balloons. If the curved cutting edge is shorter than the desired seams 18, the seams are prestrained upon inverting in the same manner as discussed above. If the curved cutting and sealing edge is longer than the desired seams 18, index line 40 is then shorter than the cutting and sealing edge. In this embodiment of the invention, the seam, rather than being prestrained along the index line, is prestrained along the cutting and sealing edge, prior to cutting and sealing. Inverting would then occur as above, with the seam 18 being allowed to relax upon inverting.

Although the invention has been described in connection with the preferred embodiment, it is not intended to limit the invention to the particular form set forth. To the contrary, the description is intended to cover such alternatives, modifications and equivalents as may be included within the spirit and scope of the invention as defined by the appended claims.

I claim:

1. A balloon envelope for high-altitude balloons, made on a balloon assembly table having a flat surface, a straight cutting and sealing edge, and a curved index line on said surface comprising:
a number of elongated gores, whose adjacent edges are sealed together to form a gas-containing envelope thereby forming a number of vertical seams, said seams being made by cutting and sealing a pair of adjacent edges along said straight edge of said assembly table, said seams being then prestrained during assembly by being stretched and aligned along said curved index line on said surface of said assembly table, said gores having ends that are close together at the top and bottom of said balloon envelope to form a top vertex and a bottom vertex.

2. The balloon envelope described in claim 1 wherein load tape containing stretchable material is incorporated into said seams, said load tape being prestrained during assembly of the balloon.

3. The balloon envelope described in claim 2 wherein said load tape has a limiting strain value ranging from 1% to 5%.

4. The balloon envelope described in claim 2 wherein said gores are made from a flexible plastic material of a predetermined shape having a limiting strain value along its edges that is less than the limiting strain value of said load tape.

5. The balloon envelope described in claim 2 wherein said gores are of a predetermined length, which is greater than or equal to the number obtained by dividing the number 8 by the limiting strain value of said load tape, taking the square root of the quotient, and multiplying the square root by the maximum gore width.

6. The balloon envelope described in claim 1, further comprising a cap, consisting of a number of partial gores having lengths shorter than the length of said seams.

7. The balloon envelope described in claim 6 where the seams of said partial gores coincide with said seams of said gores having a full gore length.

8. A balloon envelope for high-altitude balloons, made on a balloon assembly table having a flat surface, a straight cutting and sealing edge, and a curved index line on said surface comprising:
a number of elongated gores, whose adjacent edges are sealed together to form a gas-containing envelope with a plurality of vertical seams, said gores being assembled from an asymmetrical gore pattern, said asymmetrical gore pattern being straight on a first side along said straight cutting and sealing edge and being curve-shaped on a second side along said curved index line on said assembly table, said gores having ends that are close together at the top and bottom of said balloon envelope to form a bottom vertex and a top vertex, whereby said asymmetrical gore pattern permits adjacent edges of said gores to be cut and sealed along said straight side of said gore pattern to form a seam, with said seam being aligned and stretched along the curved side of said gore pattern, giving the balloon envelope a rounded shape upon inflation.

9. A method for assembling a balloon envelope comprising the steps of:
placing a bottom sheet and a top sheet of gore material upon an elongated flat surface having an edge for cutting and sealing;
cutting said sheets of gore material to a predetermined gore length;
cutting and sealing together a second edge of said bottom sheet to a first edge of said top sheet, along said cutting and sealing edge, thereby forming a seam along a straight line;
securing the ends of each seam at each end of a line representing a predetermined gore length;
moving and aligning said seam to a curved index line on said flat surface, said index line being longer than said cutting edge, while applying tension along said seam, such that the force applied has both longitudinal and latitudinal components;
repeating the above steps until a desired number of gores have been cut and sealed;
sealing the first edge of said first sheet to the second edge of the final sheet to form a closing seam.

10. The method described in claim 9 wherein load tape is placed along said seam and simultaneously sealed into said seam, said load tape having stretchable fibers within said load tape, such that said fibers increase the limiting strain value of said load tape by permitting the load tape to be stretched a certain percent of its length without great resistance.

11. The method described in claim 10 wherein the strain in the gore material caused by said moving and aligning step is less than said limiting strain value of said load tape.

12. The method described in claim 10 wherein the minimum gore length is calculated by dividing the number 8 by said limiting strain value of said load tape, taking the square root of the quotient and multiplying the square root by the maximum gore width.

13. The method described in claim 9 wherein a cap is added to the balloon, the addition of said cap further comprising the steps of:
laying a pair of additional sheets of gore material atop said surface prior to said cutting and sealing step, and cutting said additional sheets to a predetermined length, shorter than said gore length, prior to said cutting and sealing step,
cutting and sealing the edges of said additional sheets of gore material at the same time as the cutting and sealing step for the gores having a full gore length.

14. A method for assembling a balloon envelope comprising the steps of:
placing a bottom sheet and a top sheet of gore material upon an elongated flat surface having an edge for cutting and sealing;
cutting said sheets of gore material to a predetermined gore length;
aligning one pair of corresponding edges of said top sheet and said bttom sheet along a line between two points at said edge, the distance between said points approximating a predetermined gore length;
securing said material on said surface near said cutting and sealing edge, at said two points;
cutting and sealing together a second edge of said bottom sheet to a first edge of said top sheet, along said cutting edge, thereby forming a seam along said edge;
moving and aligning said seam to an index line on said surface; said index line being asymmetric with respect to said cutting and sealing edge, but being within a certain predetermined range of lengths and curvatures with respect to said cutting and sealing edge;
repeating the above steps until a desired number of gores have been cut and sealed;
sealing the first edge of said first sheet to the second edge of the final sheet to form a closing seam.

15. The method described in claim 14 wherein load tape is placed along said seam and simultaneously sealed into said seam, said load tape having stretchable materials within said load tape, such that said fibers increase the limiting strain value of said load tape by permitting the load tape to be stretched a certain percent of its length without great resistance.

16. The method described in claim 15 wherein said moving and aligning step along said index line results in a strain along said seam that is less than said limiting strain value of said load tape.

17. The method described in claim 15 wherein the minimum gore length is calculated by dividing the number 8 by said limiting strain value of said load tape, taking the square root of the quotient, and multiplying the square root by the maximum gore width.

18. The method described in claim 14 wherein a cap is added to the balloon, the addition of said cap further comprising the steps of:
laying a pair of additional sheets of gore material atop said surface prior to said cutting and sealing step;
cutting said additional sheets to a predetermined length, shorter than said gore length;
aligning, cutting, and sealing the edges of said additional sheets of gore material at the same time as the cutting and sealing step for the gores having a full gore length.

19. A balloon assembly table for making high-altitude balloons with gores cut and shaped from an asymmetrical gore pattern comprising:
a table having a flat surface and a straight edge for cutting and sealing, said straight edge being a first side of said asymmetrical gore pattern;
a moveable index line on the surface of said table for use as a reference for obtaining a desired balloon shape, said index line being a second side of said asymmetrical gore pattern.

20. The balloon assembly table of claim 19, further comprising:
a track operatively associated with said table along said straight edge; and
a cutting and sealing machine mounted on said track for sealing edges of gore material while said gore material is placed on said table as said machine moves along said track.

21. A balloon assembly table for making high-altitude balloons with gores cut and shaped from an assymetrical gore pattern comprising:
a flat surface upono which material for said gores may be laid, folded, and secured;
a means for cutting and sealing said gores along a straight edge, thereby forming a seam, said means for cutting and sealing forming a first edge of said asymmetrical gore pattern;
an index line for aligning each of said seams along a curved path, thereby forming a second edge of said asymmetrical gore pattern.

* * * * *